(12) United States Patent
Naito et al.

(10) Patent No.: US 12,431,522 B2
(45) Date of Patent: Sep. 30, 2025

(54) FUEL CELL SYSTEM

(71) Applicant: HONDA MOTOR CO., LTD., Tokyo (JP)

(72) Inventors: Hideharu Naito, Wako (JP); Hideo Aizawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 731 days.

(21) Appl. No.: 17/681,809

(22) Filed: Feb. 27, 2022

(65) Prior Publication Data

US 2022/0311039 A1    Sep. 29, 2022

(30) Foreign Application Priority Data

Mar. 25, 2021  (JP) .................................. 2021-051239

(51) Int. Cl.
| | |
|---|---|
| H01M 8/2475 | (2016.01) |
| H01M 8/0247 | (2016.01) |
| H01M 8/0258 | (2016.01) |
| H01M 8/04537 | (2016.01) |

(52) U.S. Cl.
CPC ....... *H01M 8/2475* (2013.01); *H01M 8/0247* (2013.01); *H01M 8/0258* (2013.01); *H01M 8/04559* (2013.01); *H01M 2250/20* (2013.01)

(58) Field of Classification Search
CPC ............ H01M 8/2475; H01M 8/0247; H01M 8/0258; H01M 8/04559; H01M 2250/20
USPC ........................................................ 429/467
See application file for complete search history.

(56) References Cited

U.S. PATENT DOCUMENTS

| | | | |
|---|---|---|---|
| 2007/0134524 A1* | 6/2007 | Cho .................... | H01M 8/2484 |
| | | | 429/456 |
| 2009/0075134 A1* | 3/2009 | Tanaka ................ | H01M 8/0273 |
| | | | 429/434 |
| 2016/0133984 A1 | 5/2016 | Takeyama et al. | |
| 2016/0226084 A1 | 8/2016 | Itoga | |
| 2019/0252714 A1 | 8/2019 | Mizusaki et al. | |
| 2019/0260059 A1* | 8/2019 | Mizusaki .......... | H01M 8/04089 |
| 2020/0067108 A1 | 2/2020 | Yoshitomi et al. | |

(Continued)

FOREIGN PATENT DOCUMENTS

| | | |
|---|---|---|
| CN | 1979939 A | 6/2007 |
| CN | 110165246 A | 8/2019 |
| CN | 110176619 A | 8/2019 |

(Continued)

OTHER PUBLICATIONS

Wakahoi, T, Fuel Cell Stack, Jan. 25, 2007, JP-2007018832-A (Year: 2007).*

(Continued)

*Primary Examiner* — Allison Bourke
*Assistant Examiner* — Robert Gene West
(74) *Attorney, Agent, or Firm* — Carrier, Shende & Associates P.C.; Fulchand P. Shende; Joseph P. Carrier (57) ABSTRACT

A fuel cell system comprises a stack case in which there is accommodated a fuel cell stack in which unit cells are stacked. An opening is formed in an end part in the stack case. In this opening, cell voltage detection terminals, which are electrically connected to electrodes of the unit cells, are exposed. The opening is closed by a closing member in which filter bodies are retained. When the opening is viewed from the front, the filter bodies are arranged at positions that do not overlap with the cell voltage detection terminals.

6 Claims, 9 Drawing Sheets

(56) References Cited

U.S. PATENT DOCUMENTS

2020/0161691 A1   5/2020   Yoshitomi

FOREIGN PATENT DOCUMENTS

| CN | 111490282 A |   | 8/2020  |             |
|----|-------------|---|---------|-------------|
| JP | 2006156028 A | * | 6/2006 | .......... H01M 8/0267 |
| JP | 2007018832 A | * | 1/2007 | ............. H01M 8/24 |
| JP | 2008-027690 A |   | 2/2008  |             |
| JP | 2008-171635 A |   | 7/2008  |             |
| JP | 2015-076152 A |   | 4/2015  |             |
| JP | 2017-084578 A |   | 5/2017  |             |
| JP | 2020-029190 A |   | 2/2020  |             |
| JP | 2020-082753 A |   | 6/2020  |             |

OTHER PUBLICATIONS

Irizuki, K, Ventilation Device for Fuel Cell, Jun. 15, 2006, JP-2006156028-A (Year: 2006).*

Office Action dated Nov. 8, 2024 issued in the corresponding Chinese Patent Application No. 202210183526.2 with the English machine translation thereof.

* cited by examiner

FUEL CELL SYSTEM

CROSS-REFERENCE TO RELATED APPLICATIONS

This application is based upon and claims the benefit of priority from Japanese Patent Application No. 2021-051239 filed on Mar. 25, 2021, the contents of which are incorporated herein by reference.

BACKGROUND OF THE INVENTION

Field of the Invention

The present invention relates to a fuel cell system including a fuel cell stack in which a plurality of individual unit cells are stacked, and a stack case in which the fuel cell stack is accommodated.

Description of the Related Art

In the case that a fuel cell system including a fuel cell stack is mounted in a vehicle, for example, as described in JP 2015-076152 A, the fuel cell stack is accommodated inside a stack case. In the stack case described in FIG. 1 of JP 2015-076152 A, an opening is formed in a wall surface covering an end part in a stacking direction of the unit cells that make up the fuel cell stack. The opening is covered by a ventilation cover. In this case, it has been attempted to discharge a small amount of hydrogen gas, which inevitably leaks from the fuel cell stack, to the exterior of the stack case through the ventilation cover.

The fuel cell system is configured to include a voltage control unit (VCU) that controls the voltage of the fuel cell stack. The VCU is accommodated in a VCU case. The VCU case, for example, as shown in JP 2020-082753 A and JP 2020-029190 A, is disposed rearwardly of the stack case in a traveling direction of a vehicle. A rearward opening (referred to as a "rear window" in JP 2020-029190 A) is formed in a rear portion of the stack case. A front portion of the VCU case faces toward such an opening.

Cell voltage detection terminals are electrically connected via harnesses to each of the electrodes of the fuel cell stack. Hereinafter, the cell voltage detection terminals may be referred to as "cell V terminals". The cell V terminals are exposed in the rearward opening. Accordingly, an operator is capable of inserting his or her hand through the rearward opening and performing maintenance on the terminals and the vicinity of the terminals. In this manner, the rearward opening serves as a window through which the operator is able to perform work.

SUMMARY OF THE INVENTION

It may be considered to attach the ventilation cover disclosed in JP 2015-076152 A to the rearward opening disclosed in JP 2020-082753 A and JP 2020-029190 A. In this case, it is necessary to avoid a situation in which connecting members (bolts or the like) in order to connect the ventilation cover to the stack case interfere with the VCU case. For this purpose, it may be called to mind that the front part of the VCU case should be separated by an appropriate distance from the rearward opening. However, in this case, connecting bodies that connect the stack case and the VCU case are disadvantageously of a large scale along front and rear directions in the traveling direction of the vehicle.

A principal object of the present invention is to reduce the size and scale of the fuel cell system, in a fuel cell system in which the stack case and an electrical component storage case are connected.

According to one embodiment of the present invention, there is provided a fuel cell system comprising a fuel cell stack in which a plurality of individual unit cells are stacked, and a stack case configured to accommodate the fuel cell stack in an interior thereof, wherein:

an opening is formed in an end part of the stack case, and at the plurality of individual unit cells, a plurality of individual cell voltage detection terminals electrically connected to electrodes of the plurality of individual unit cells are provided at portions facing toward the opening;

the stack case comprises a closing member configured to close the opening;

the closing member includes a plurality of individual mounting holes and a plurality of individual filter bodies individually retained in the plurality of individual mounting holes; and the plurality of individual filter bodies include housings configured to be fitted in the plurality of individual mounting holes, and filter membranes retained in the housings, and when the opening is viewed from the front, the plurality of individual filter bodies are disposed at positions that do not overlap with the plurality of individual cell voltage detection terminals.

According to another embodiment of the present invention, there is provided a fuel cell system comprising a fuel cell stack in which a plurality of individual unit cells are stacked, and a stack case configured to accommodate the fuel cell stack in an interior thereof, wherein:

an opening is formed in an end part of the stack case, and the unit cells is provided with, at portions facing toward the opening, a plurality of individual cell voltage detection terminals electrically connected to electrodes of the plurality of individual unit cells;

the stack case comprises a closing member configured to close the opening;

the closing member includes a plurality of individual mounting holes and a plurality of individual filter bodies individually retained in the plurality of individual mounting holes;

an electrical equipment storage case configured to contain the electrical equipment is provided at an end of the stack case in which the opening is formed;

the electrical equipment storage case is formed with a plurality of individual ribs on an end surface facing toward the closing member; and connecting members configured to connect the closing member to the stack case are inserted into internal spaces surrounded by the plurality of individual ribs.

In the case that the filter bodies are overlapped with the cell voltage detection terminals, it is necessary for the filter bodies and the detection terminals to be sufficiently separated from each other, in a manner so that the cell voltage detection terminals and the filter bodies do not interfere with each other. In contrast to this requirement, according to the present invention, when the opening is viewed from the front, the filter bodies are arranged at positions that do not overlap with the cell voltage detection terminals. In this case, for example, even when the thickness of the closing member that retains the filter bodies, or the thickness of the stack case is reduced, it is possible to avoid a situation in which the cell voltage detection terminals and the filter bodies interfere with each other. This is because the filter bodies are in positions where the filter bodies do not overlap with the cell voltage detection terminals.

Therefore, according to the present invention, it is possible to reduce the thickness of the closing member or the stack case. Consequently, it is possible to reduce the size and scale of the fuel cell system.

Further, according to the other embodiment of the present invention, predetermined sites of the connecting members for attaching the closing member to the stack case are inserted into the internal spaces, which is formed by the plurality of individual ribs that are formed in the electrical equipment storage case. In this case, since a situation is avoided in which the electrical equipment storage case is stopped by the connecting members, the electrical equipment storage case is in close proximity to the stack case. Accordingly, it is possible to reduce the size and scale of the fuel cell system.

The above and other objects, features, and advantages of the present invention will become more apparent from the following description when taken in conjunction with the accompanying drawings, in which preferred embodiments of the present invention are shown by way of illustrative example.

DESCRIPTION OF THE INVENTION

Preferred embodiments of a fuel cell system according to the present invention will be presented and described in detail below with reference to the accompanying drawings. Moreover, in the following description, the terms "left (ward)", "right(ward)", "front(ward)", "rear(ward)", "down (ward)", and "up(ward)" represent left, right, front, rear, lower, and upper directions from the perspective of a user who is seated in a driver's seat. Further, a vehicle widthwise direction is synonymous with a left-right direction of the vehicle, a vehicle lengthwise direction is synonymous with a front-rear direction or a traveling direction of the vehicle, and a vehicle heightwise direction is synonymous with a vertical direction of the vehicle.

Figure 1:
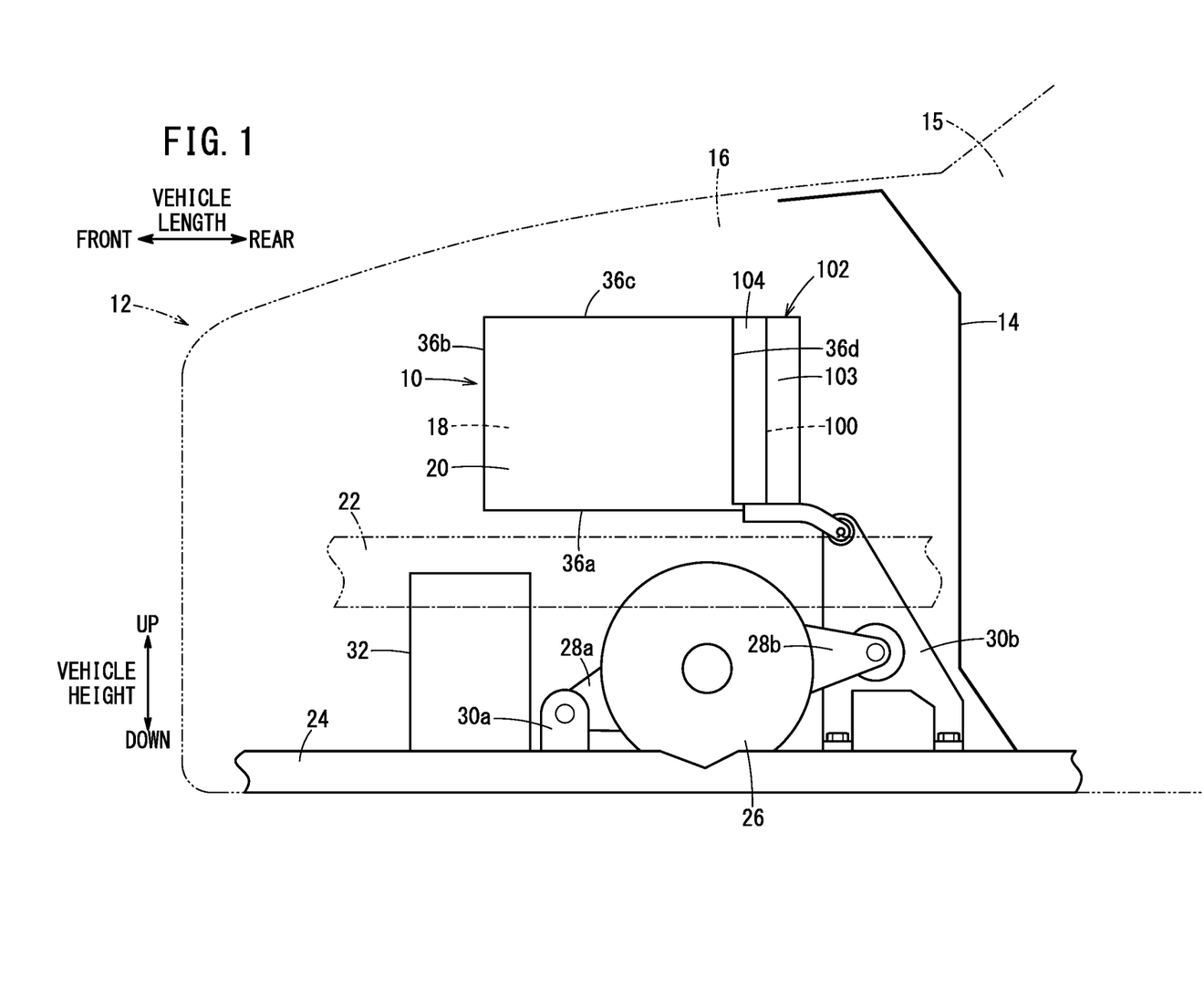
FIG. 1 is a schematic side view of principal components of a vehicle equipped with a fuel cell system according to an embodiment of the present invention.

FIG. 1 is a schematic side view of principal components of a fuel cell vehicle 12 (vehicle) equipped with a fuel cell system 10 according to a present embodiment. A front room 16 is provided in a front portion of the fuel cell vehicle 12. The front room 16 is isolated from the passenger compartment 15 by a dashboard 14. A stack case 20 in which a fuel cell stack 18 is accommodated is disposed inside the front room 16.

A side frame 22 and a cross member 24 constituting a vehicle body frame are provided in the front room 16. The side frame 22 extends in the vehicle lengthwise direction. The cross member 24 extends in the vehicle widthwise direction at a more downward location than the side frame 22.

The fuel cell stack 18 carries out generation of electrical power based on electrochemical reactions taking place between a fuel gas and an oxygen containing gas supplied from a fuel gas supply device and an oxygen containing gas supply device (neither of which is shown). The fuel cell stack 18 supplies a generated electrical power that is generated by generation of electrical power to a traveling motor 26 or a non-illustrated battery provided in the front room 16.

In this case, the traveling motor 26 is arranged downwardly of the fuel cell stack 18 or the stack case 20. The traveling motor 26 serves to propel the fuel cell vehicle 12 via a non-illustrated transmission, the vehicle wheels, and the like. A front portion of the traveling motor 26 is fixed to the cross member 24 via a motor bracket 28a and a frontward supporting body 30a. A rear portion of the traveling motor 26 is fixed to the cross member 24 via a motor bracket 28b and a rearward supporting body 30b.

A PDU (Power Drive Unit) 32 that supplies a suitable amount of electrical power to the traveling motor 26 is provided at a more frontward location than the traveling motor 26. The PDU 32 is configured in the form of a three-phase bridge type inverter. The PDU 32 converts the generated electrical power (DC power) of the fuel cell stack 18 into AC power. Alternatively, based on the control of a non-illustrated ECU (Electronic Control Unit), the PDU 32 adjusts a rotary driving force of the traveling motor 26.

Figure 2:
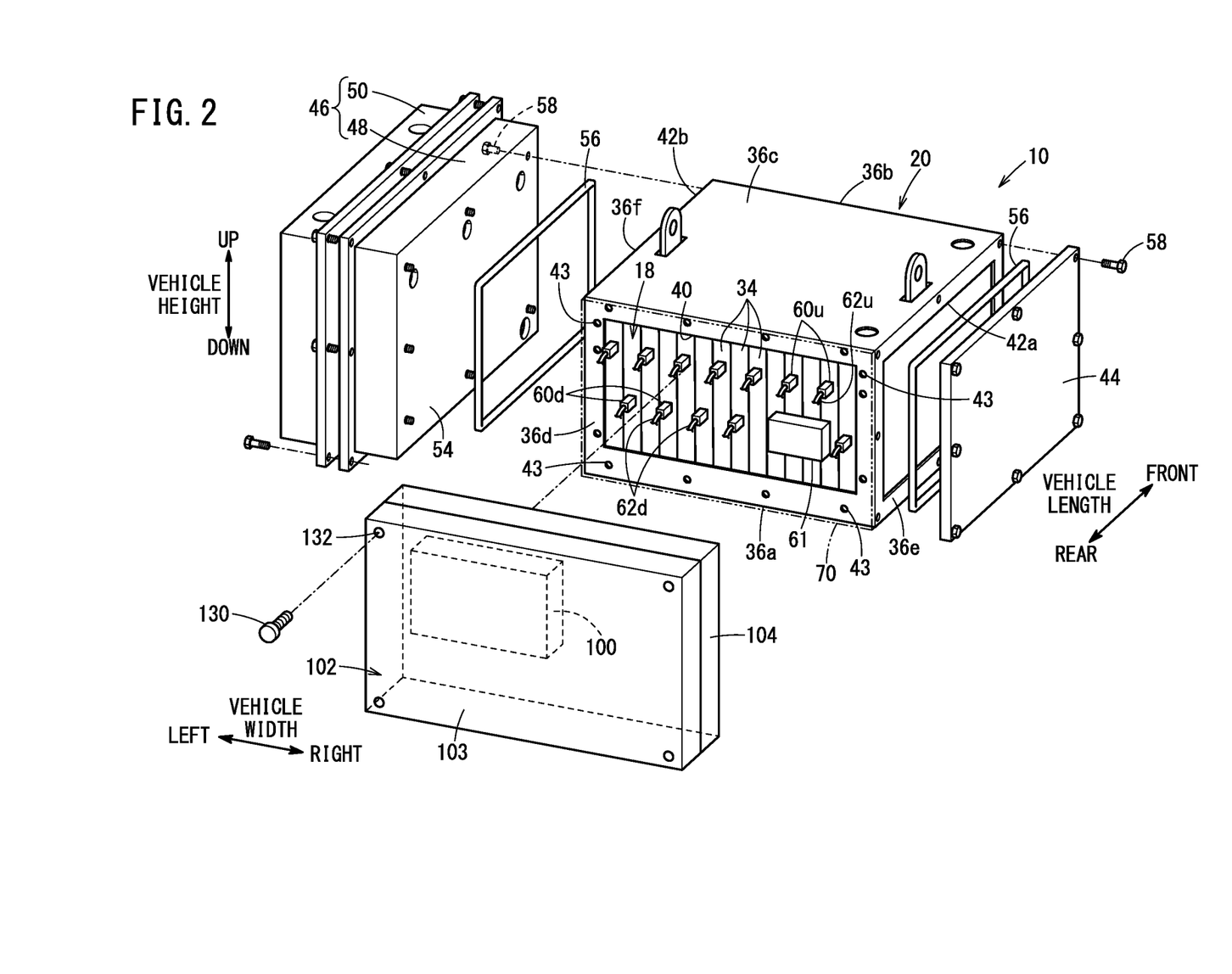
FIG. 2 is a schematic perspective view as seen from the rear of a stack case constituting the fuel cell system.

As shown in FIG. 2, the fuel cell stack 18 comprises a plurality of unit cells 34 stacked along the vehicle widthwise direction. The fuel cell stack 18 is accommodated in such a state in the interior of the stack case 20. At this time, the electrodes of the unit cells 34 face toward the vertical direction.

The stack case 20 includes a bottom wall portion 36a, a front wall portion 36b, and an upper wall portion 36c. A rearward opening 40 is formed in a rear portion 36d of the stack case 20. Further, a right opening 42a and a left opening 42b are also formed respectively on a right side portion 36e and a left side portion 36f of the stack case 20 in the vehicle widthwise direction. Moreover, reference numeral 43 indicates bolt holes into which later described fixing bolts 74 are screw-engaged.

At a right end in the stacking direction (vehicle widthwise direction) of the unit cells 34, a first terminal plate and a first insulating plate, neither of which are shown, are arranged sequentially in this order from an inner side toward an outer side. The first terminal plate and the first insulating plate are accommodated inside the stack case 20. Further, the first end plate 44 is attached to the right side portion 36e of the stack case 20. The first end plate 44 closes the right opening 42a of the stack case 20, and imparts a tightening load in the stacking direction to a stacked body of the unit cells 34.

Similarly, at a left end in the stacking direction of the unit cells 34, a second terminal plate and a second insulating plate, neither of which are shown, are arranged sequentially in this order from an inner side toward an outer side. The second terminal plate and the second insulating plate are accommodated inside the stack case 20. Further, an auxiliary equipment case 46 is attached to the left side portion 36f of the stack case 20.

The auxiliary equipment case 46 includes a concave shaped first case member 48, and a concave shaped second case member 50. The first case member 48 is screw-engaged to the stack case 20. The second case member 50 is joined to the first case member 48. Auxiliary equipment is accommodated in the interior of the first case member 48 and the second case member 50. The auxiliary equipment, for example, is hydrogen-based auxiliary equipment (hydrogen gas supply devices: devices of the fuel cell system) such as pipes, an injector, a hydrogen pump, valves, and the like.

The first case member 48 includes a wall portion 54. The wall portion 54 closes the left opening 42b on the left end in the stacking direction of the stack case 20. The wall portion 54 functions as a second end plate, and imparts a tightening load in the stacking direction to the stacked body of the unit cells 34. A sealing member 56 is interposed respectively between the stack case 20, and the first end plate 44 and the wall portion 54. The first end plate 44 and the wall portion 54 are attached to the stack case 20 by connecting bolts 58.

In the stacked unit cells 34, each of the anodes and the cathodes of the unit cells 34 which are positioned on both ends are electrically connected respectively to the first terminal plate and the second terminal plate. Furthermore, portions of both of the terminal plates protrude outwardly from openings of the upper wall portion 36c of the stack case 20, and are electrically connected to the VCU 100 via non-illustrated contactors. Cell V terminals (cell voltage detection terminals) 60d or cell V terminals 60u are electrically connected to each of the unit cells 34. Although not illustrated in particular, connecting locations are provided on outer peripheral edge portions of separators in each of the unit cells 34. The cell V terminals 60d and 60u are electrically connected to the connecting locations. The cell V terminals 60d and 60u are detachably provided at a rear portion of the fuel cell stack 18 facing toward the rearward opening 40, and are exposed in the rearward opening 40.

Figure 3:
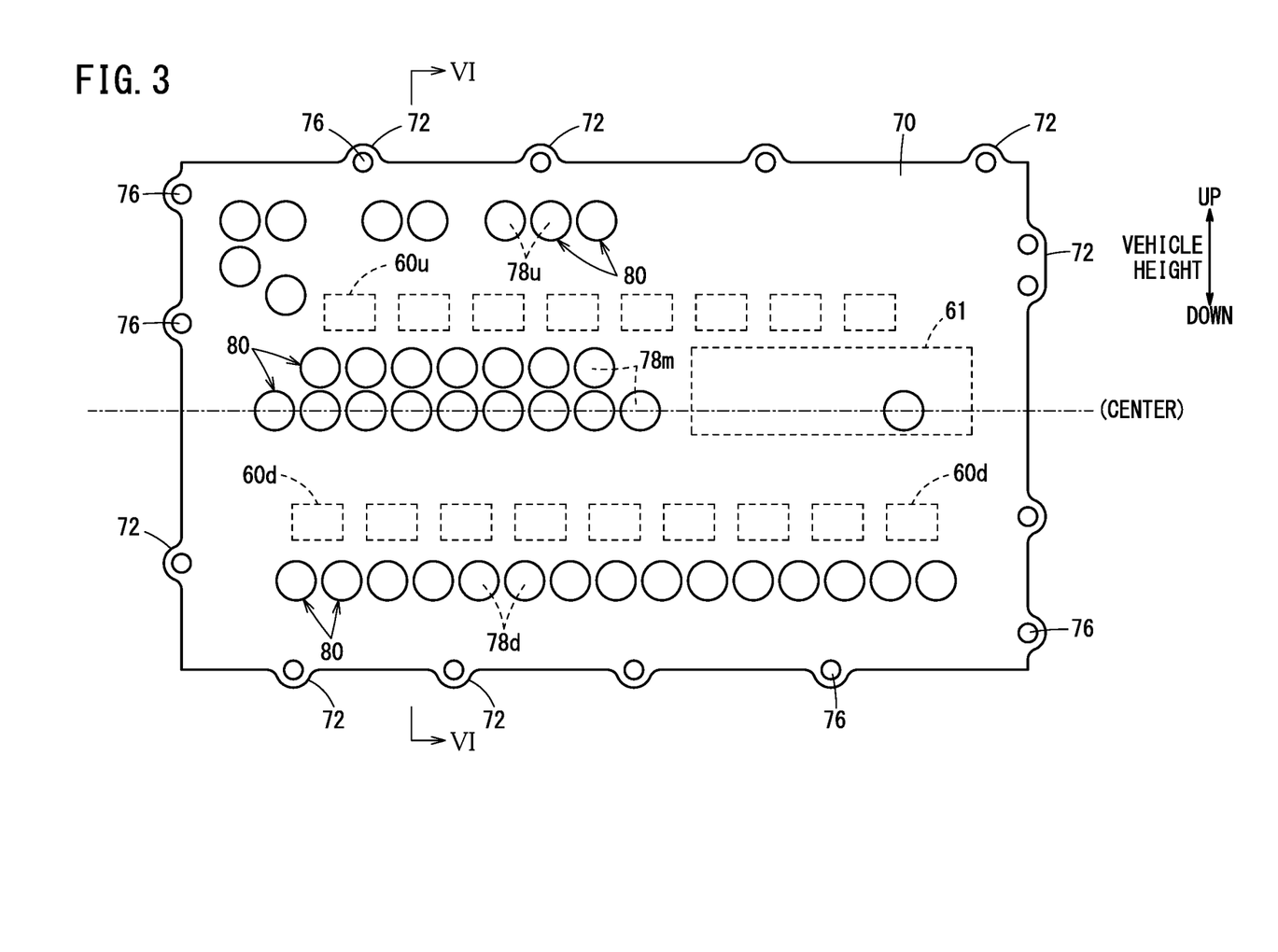
FIG. 3 is a front view of a closing member which is visually recognized from a rear side (a side of a rearward opening) of the vehicle in the stack case.
Figure 4:
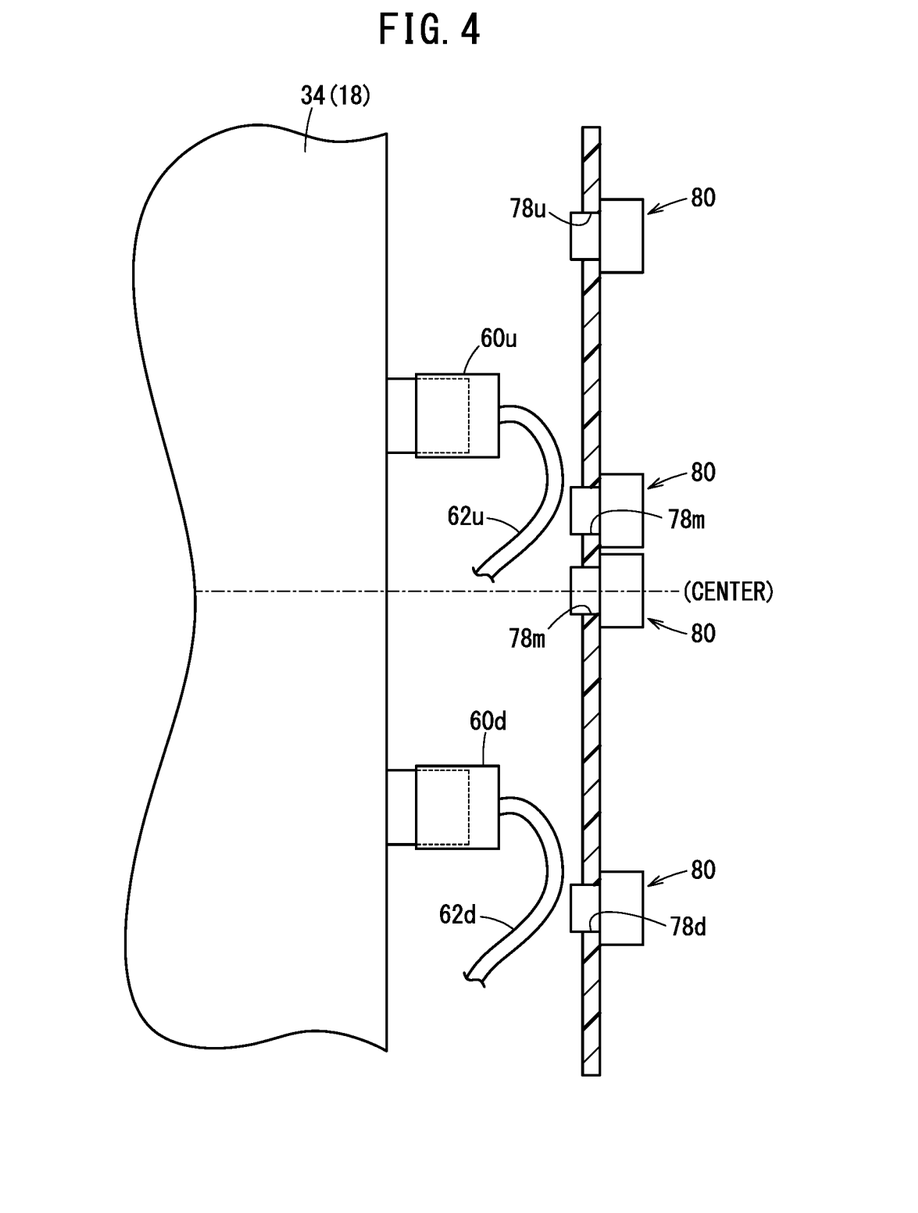
FIG. 4 is a cross-sectional view taken along line VI-VI of FIG. 3 of principal components of the stack case along a vehicle heightwise direction on the rear side of the vehicle.

As shown in FIGS. 3 and 4, the cell V terminals 60d are positioned at a more downward position than a central location of the unit cells 34 in the vehicle heightwise direction. In contrast thereto, the cell V terminals 60u are arranged more upwardly than the central location of the unit cells 34 in the vehicle heightwise direction. The cell V terminals 60d and 60u are arranged alongside one another in the stacking direction of the unit cells 34, so as to be alternately adjacent to each other. Therefore, the cell V terminals 60d and 60u are arranged in a staggered manner in the vertical direction of the unit cells 34.

Harnesses 62d and 62u that transmit the detected cell voltages to the cell voltage control unit 61 extend respectively from the cell V terminals 60d and 60u. The cell voltage control unit 61 collects the voltages detected at the cell V terminals 60d and 60u, and after having processed them internally, transmits the voltages to a control system of the fuel cell stack 18.

Figure 5:
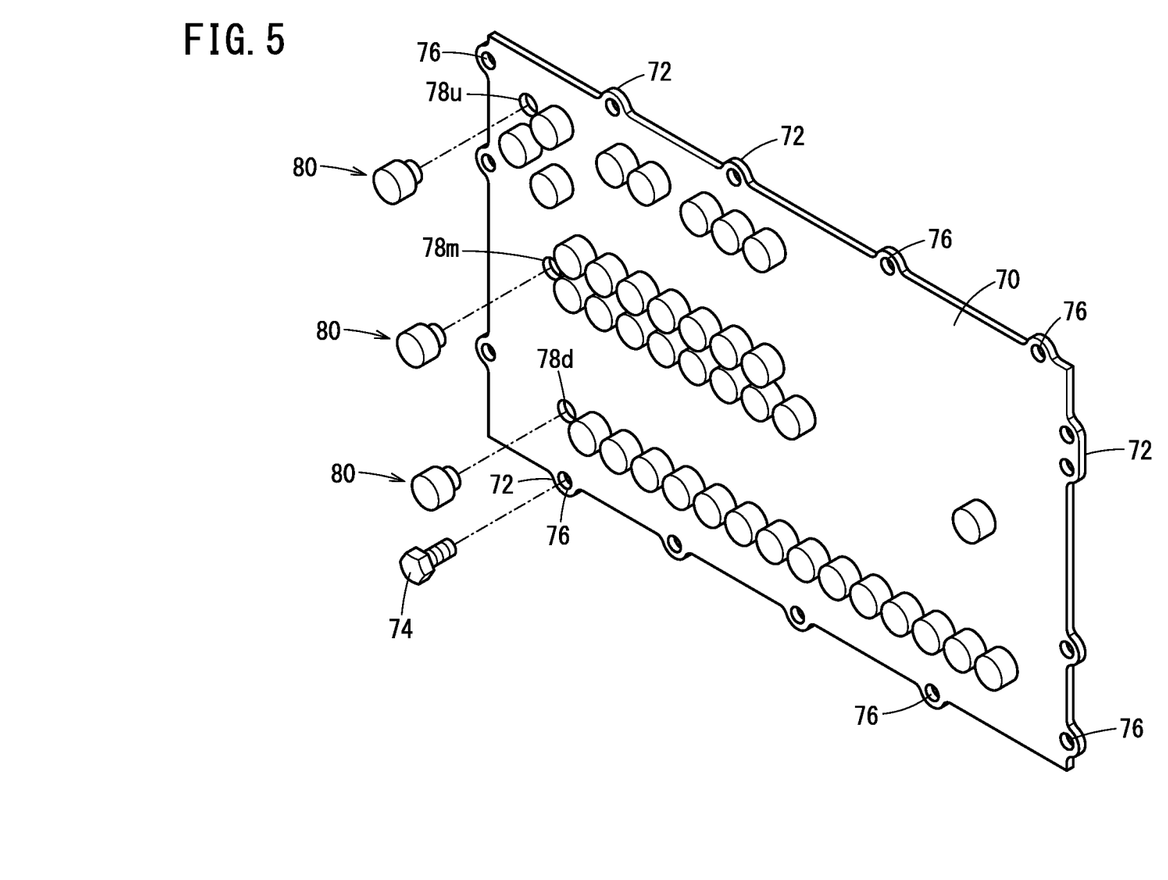
FIG. 5 is an overall schematic perspective view of the closing member.

The rearward opening 40 is closed by the closing member 70. As shown in FIGS. 3 and 5, bolt insertion holes 76 in order for fixing bolts 74 (connecting members) to be inserted therethrough are formed in tab portions 72 that protrude from outer edge portions of the closing member 70. Threaded portions of the fixing bolts 74 are passed through the bolt insertion holes 76 and are screw-engaged in the bolt holes 43. Due to such screw-engagement, the closing member 70 is attached to the rear portion 36d of the stack case 20.

A plurality of individual lower mounting holes 78d are formed in the closing member 70 at a more downward position than the cell V terminals 60d. Further, a plurality of individual intermediate mounting holes 78m are formed at a position between the cell V terminals 60d and the cell V terminals 60u. Furthermore, a plurality of individual upper mounting holes 78u are formed at a more upward position than the cell V terminals 60u. The plurality of individual lower mounting holes 78d are arranged along the vehicle widthwise direction. Similarly, the plurality of individual intermediate mounting holes 78m and the plurality of individual upper mounting holes 78u are also aligned respectively along the vehicle widthwise direction. Accordingly, when the rear portion 36d of the stack case 20 is viewed from the front in a state in which the rearward opening 40 is closed by the closing member 70, the lower mounting holes 78d, the intermediate mounting holes 78m, and the upper mounting holes 78u do not overlap with the cell V terminals 60d and 60u.

In the illustrated example, the number of rows of the lower mounting holes 78d and the upper mounting holes 78u is one, and the number of rows of the intermediate mounting holes 78m is two. The lower mounting holes 78d, the intermediate mounting holes 78m, and the upper mounting holes 78u may be formed over the entire area from the left to the right in the vehicle widthwise direction, although the present invention is not particularly limited to this feature. For example, the lower mounting holes 78d, the intermediate mounting holes 78m, and the upper mounting holes 78u may be formed only in a central interval from the left or the right in the vehicle widthwise direction. Alternatively, the lower mounting holes 78d, the intermediate mounting holes 78m, and the upper mounting holes 78u may be formed only in a middle position in the vehicle widthwise direction.

Figure 6:
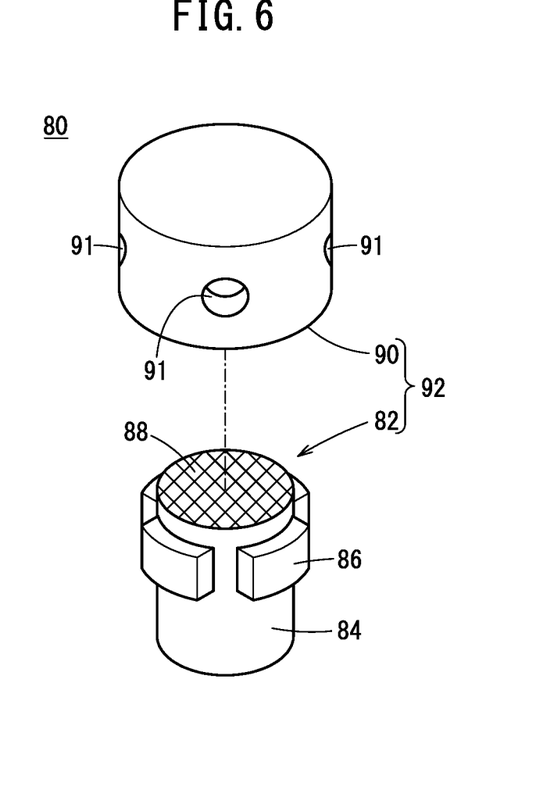
FIG. 6 is a schematic exploded perspective view of a filter body.

Filter bodies 80 are detachably fitted, respectively, into the lower mounting holes 78d, the intermediate mounting holes 78m, and the upper mounting holes 78u. Stated otherwise, a plurality of the filter bodies 80 are retained in the closing member 70. As shown in FIG. 6, in this case, each of the filter bodies 80 includes a housing base member 82. The housing base member 82 is formed in a shape in which a small diameter portion 84 and a large diameter portion 86 are connected. The small diameter portion 84 and the large diameter portion 86 are substantially cylindrical bodies having different diameters from each other. Furthermore, each of the filter bodies 80 includes a filter membrane 88 and a cap member 90. The filter membrane 88 is retained in the housing base member 82. The cap member 90 covers the large diameter portion 86 of the housing base member 82. Openings 91 are formed in a side peripheral wall portion of the cap member 90. The openings 91 penetrate through the cap member 90 along a thickness direction of the side peripheral wall portion of the cap member 90.

A housing 92 in which the filter membrane 88 is retained is constituted by the housing base member 82 and the cap member 90. The small diameter portion 84 of the housing base member 82 is fitted into the lower mounting holes 78d, the intermediate mounting holes 78m, and the upper mounting holes 78u. A sealing member may be interposed between the closing member 70 and the small diameter portion 84.

The filter membranes 88 serve to collect foreign matter. As a specific example of such filter bodies 80, there may be cited a so-called vent filter. However, the filter bodies 80 are not limited to being vent filters.

As discussed previously, when the rear portion 36d or the rearward opening 40 of the stack case 20 is viewed from the front, the lower mounting holes 78d, the intermediate mounting holes 78*m*, and the upper mounting holes 78*u* are formed at positions that do not overlap with the cell V terminals 60*d* and 60*u*. Therefore, the filter bodies 80, which are individually fitted into the lower mounting holes 78*d*, the intermediate mounting holes 78*m*, and the upper mounting holes 78*u*, are arranged at positions that do not overlap with the cell V terminals 60*d* and 60*u*.

Figure 7:
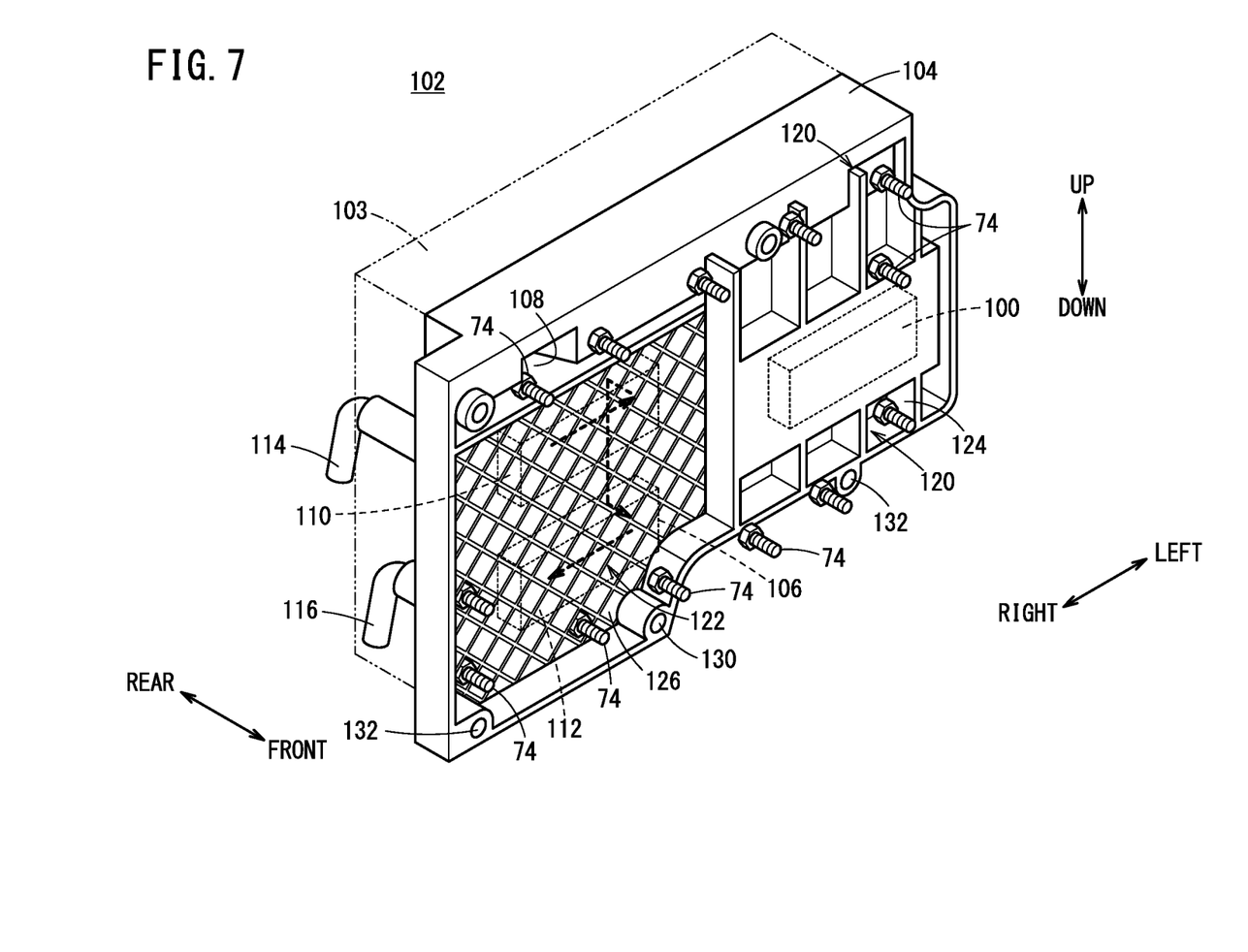
FIG. 7 is a schematic perspective view of an electrical equipment storage case that is connected to the stack case.

As shown in FIG. 2, the VCU case 102 in which the VCU 100 is accommodated is connected to the rear portion 36*d* of the stack case 20. The VCU 100 is an item of electrical equipment, and the VCU case 102 serves as an electrical equipment storage case. In this instance, in the VCU case 102, a front end surface that faces toward the rear portion 36*d* or the closing member 70 is shown in FIG. 7. The VCU case 102 includes a case main body 103, a jacket case 104 that serves as a flow path forming member, and a jacket cover 106. The jacket cover 106 is of a dimension that fits inside a right half portion of the jacket case 104. A clearance 108 is formed between an upper outer edge of the jacket cover 106 and an upper inner edge of the jacket case 104.

Figure 8:
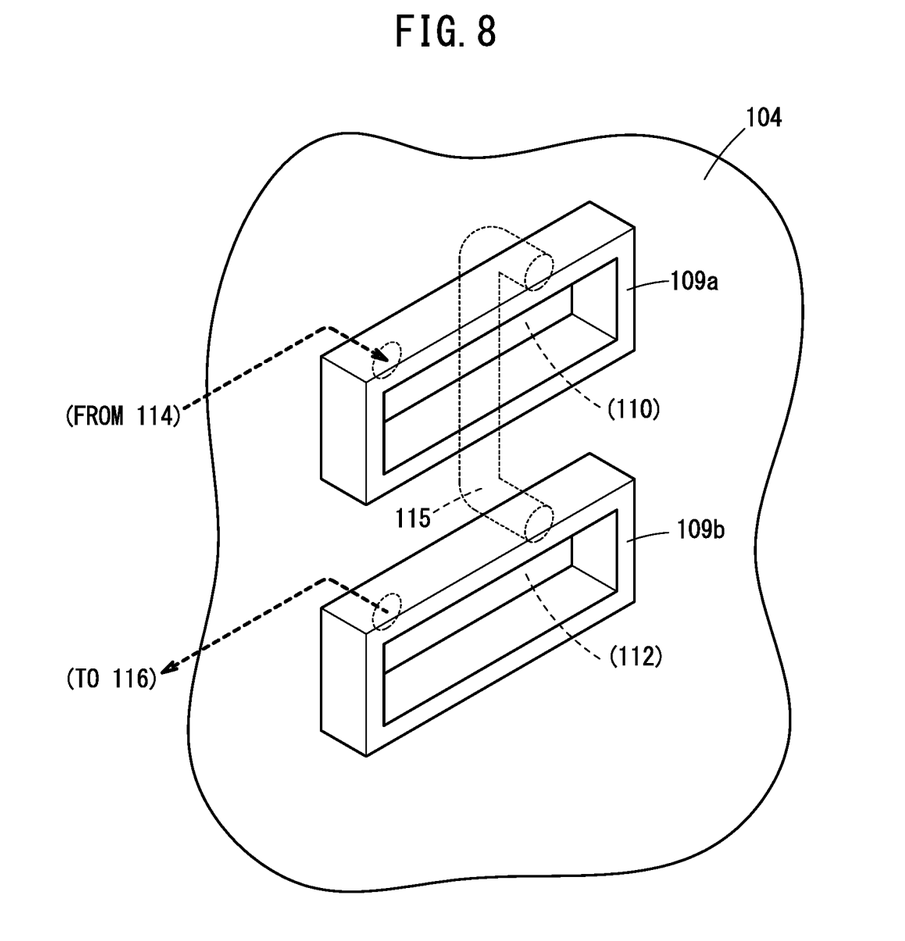
FIG. 8 is an enlarged perspective view of principal components of a jacket case constituting the electrical equipment storage case.

An upstream side water jacket 110 and a downstream side water jacket 112 are formed in the VCU case 102. The upstream side water jacket 110 and the downstream side water jacket 112 are formed between a rightward half of the jacket case 104 and the jacket cover 106. More specifically, as shown in FIG. 8, the jacket case 104 is provided with an annular rib 109*a* and an annular rib 109*b* that project out in annular shapes toward the closing member 70. When the jacket cover 106 is connected to the jacket case 104 through bolts or the like, a rear end surface of the jacket cover 106 abuts against front top surfaces of the annular rib 109*a* and the annular rib 109*b*, respectively. Due to such abutment, closed spaces are individually formed by the annular rib 109*a* and the annular rib 109*b* and the jacket cover 106. A closed space, which is formed by the annular rib 109*a* and the jacket cover 106, serves as the upstream side water jacket 110. A closed space, which is formed by the annular rib 109*b* and the jacket cover 106, serves as the downstream side water jacket 112.

Further, as shown in FIGS. 7 and 8, a supply pipe 114, a relay pipe 115, and a discharge pipe 116 are provided in the jacket case 104. A pipe from a non-illustrated coolant supply source (for example, a cooling water supply source) is connected to the supply pipe 114. In the relay pipe 115, the coolant that flows through the upstream side water jacket 110 is delivered into the downstream side water jacket 112. A pipe through which the coolant is returned to the coolant supply source is connected to the discharge pipe 116. The supply pipe 114 communicates with the upstream side water jacket 110. The discharge pipe 116 communicates with the downstream side water jacket 112. In accordance with the foregoing, a coolant flow path is formed through which the coolant is circulated through the coolant supply source, the upstream side water jacket 110, and the downstream side water jacket 112.

Figure 9:
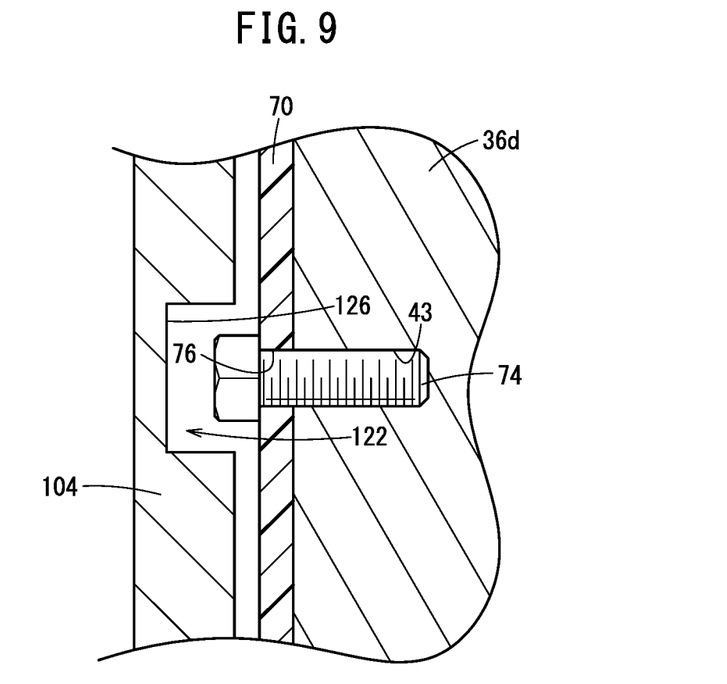
FIG. 9 is a cross-sectional view of principal components of the electrical equipment storage case.

On a front end surface of the jacket case 104, first lattice-shaped ribs 120 project out toward the closing member 70 at a lower portion and an upper portion on the left side in the vehicle widthwise direction. On the front end surface of the jacket cover 106, second lattice-shaped ribs 122 project out toward the closing member 70. The second lattice-shaped ribs 122 are inclined and intersect with each other. Internal spaces 124 and 126, which are formed due to being surrounded by the first lattice-shaped ribs 120 and the second lattice-shaped ribs 122, are concave spaces which are relatively recessed toward the rear. Heads of the fixing bolts 74 are inserted into the internal spaces 124 and 126 (concave spaces). FIG. 9 illustrates a state in which the heads of the fixing bolts 74 are inserted into the internal spaces 126. Moreover, the fixing bolts 74 are bolts for attaching the closing member 70 to the rear portion 36*d* of the stack case 20.

The heads of the fixing bolts 74 that have not been inserted into the internal spaces 124 of the first lattice-shaped ribs 120 or the internal spaces of the second lattice-shaped ribs 122 are inserted, for example, into a clearance 108. The clearance 108 is a gap formed between an upper inner edge of the jacket case 104 and an upper outer edge of the jacket cover 106. Stated otherwise, a portion of the fixing bolts 74 is positioned upwardly of the upstream side water jacket 110. In this manner, the heads of the fixing bolts 74 are positioned at locations where they do not abut against the front top surfaces of each of the first lattice-shaped ribs 120 or the second lattice-shaped ribs 122, the front end surface of the jacket case 104, and the front end surface of the jacket cover 106, and the like. More specifically, in the present embodiments, the heads of the fixing bolts 74 do not interfere with the first lattice-shaped ribs 120, the second lattice-shaped ribs 122, the jacket case 104, the jacket cover 106, and the like.

Through holes 132 through which the mounting bolts 130 are passed are formed on the outer edge of the jacket case 104. The mounting bolts 130 which have been passed through the through holes 132 are screwed-engaged into non-illustrated bolt holes formed in the rear portion 36*d* of the stack case 20. Consequently, the VCU case 102 is connected to the stack case 20. Further, a plurality of non-illustrated ventilation holes are formed in the case main body 103 and the jacket case 104.

The fuel cell system according to the present embodiment is basically configured in the manner described above. Next, operations and advantageous effects of the fuel cell system will be described.

In the case that the closing member 70 is attached to the rear portion 36*d* of the stack case 20 (the rearward opening 40 is closed by the closing member 70), the closing member 70 overlaps with the rearward opening 40. Moreover, the filter bodies 80 are fitted beforehand, respectively, into the lower mounting holes 78*d*, the intermediate mounting holes 78*m*, and the upper mounting holes 78*u*. Next, the fixing bolts 74 which have been passed through the bolt insertion holes 76 are screw-engaged into the bolt holes, and connect the closing member 70 to the rear portion 36*d*.

When the filter body 80 is at a position that overlaps with the cell V terminals 60*d* and 60*u*, due to the filter body 80 being separated by a predetermined interval from the cell V terminals 60*d* and 60*u*, a situation is avoided in which the filter body 80 interferes with the cell V terminals 60*d* and 60*u*. In this case, for example, it is necessary to increase the thickness of the closing member 70. In contrast thereto, according to the present embodiments, as discussed previously, when the rearward opening 40 is viewed from the front, the filter bodies 80 are arranged at positions that do not overlap with the cell V terminals 60*d* and 60*u*. Therefore, even in a situation in which the filter body 80 is in close proximity to the fuel cell stack 18 due to the thickness of the closing member 70 being small, interference of the housing base members 82 that constitute the housings 92 of the filter bodies 80 with the cell V terminals 60*d* and 60*u* or the harnesses 62*d* and 62*u* is avoided. The same consideration also applies when the dimension of the stack case 20 along the vehicle lengthwise direction is reduced.

More specifically, according to the present embodiments, it is possible to make the thickness of the closing member 70

(or the stack case 20) along the vehicle lengthwise direction as small as possible, and for a state to be brought about in which the filter bodies 80 are in close proximity to the fuel cell stack 18. Consequently, it is possible to reduce the size and scale of the fuel cell system in the vehicle lengthwise direction.

Further, even in the case that the harnesses 62d and 62u abut against the closing member 70, the meshes of the filter membranes 88 are not closed. Accordingly, a situation is avoided in which hydrogen, which has leaked from the fuel cell stack 18 into the stack case 20, is not discharged through the filter bodies 80. Further, since the closing member 70 is of a substantially flat plate-like shape, the closing member possesses sufficient rigidity. Consequently, the cell voltage control unit 61, which is adjacent to the inner side of the closing member 70, can be satisfactorily protected.

Thereafter, the VCU case 102 is attached to the rear portion 36d of the stack case 20. More specifically, the mounting bolts 130 are inserted through the through holes 132 and are screw-engaged in the non-illustrated bolt holes. Accompanying such screw-engagement, the VCU case 102 is placed in close contact with the stack case 20.

As noted previously, the heads of the fixing bolts 74 are inserted into the internal spaces 124 of the first lattice-shaped ribs 120 and the internal spaces 126 of the second lattice-shaped ribs 122, or alternatively, into the clearance 108 between the upper outer edge of the jacket cover 106 and the upper outer edge of the jacket case 104. Therefore, the heads of the fixing bolts 74 do not interfere with the front top surfaces of the first lattice-shaped ribs 120, the front top surfaces of the second lattice-shaped ribs 122, the front end surface of the jacket cover 106, or the front end surface of the jacket case 104. Stated otherwise, the VCU case 102 can be placed in close contact with the stack case 20 without being stopped by the fixing bolts 74. Consequently, it is possible to reduce the size and scale of the dimension of the fuel cell system in the vehicle lengthwise direction.

In this manner, according to the present embodiment, the filter bodies 80 are arranged at positions that avoid the cell V terminals 60d and 60u. As a result, the VCU case 102 is capable of moving forward toward the stack case 20 while avoiding the fixing bolts 74. For the aforementioned reasons, it is possible to reduce the size and scale along the vehicle lengthwise direction, which is the direction in which the stack case 20, the closing member 70, and the VCU case 102 are arranged.

When the fuel cell vehicle 12 shown in FIG. 1 is in operation, the fuel cell stack 18 is supplied with the fuel gas, the oxygen containing gas, and the coolant. The fuel gas is supplied to the anodes of the unit cells 34. The oxygen containing gas is supplied to the cathodes of the unit cells 34. Consequently, electrical power is generated in each of the unit cells 34, and in accordance therewith, the traveling motor 26 is driven. As a result, traveling of the fuel cell vehicle 12 is started. Moreover, the coolant is also supplied to each of the unit cells 34.

Further, the coolant such as cooling water or the like is supplied from the coolant supply source. The coolant flows from the supply pipe 114 into the upstream side water jacket 110, passes through the relay pipe 115, and flows into the downstream side water jacket 112. Furthermore, the coolant is returned from the downstream side water jacket 112 to the coolant supply source via the discharge pipe 116. By the coolant flowing in this manner, the VCU 100 is cooled.

While the fuel cell vehicle 12 is traveling, it is expected that foreign matter such as gravel or the like may be flipped up by the tires and fly into the front room 16. In the case that such a situation occurs, the foreign matter impinges against the VCU case 102. As can be understood from such a situation, the fuel cell stack 18 is protected by the VCU case 102 from such large scale foreign matter.

A portion of the traveling wind reaches from the ventilation holes of the VCU case 102 to a lower part of the rear portion 36d of the stack case 20. Thereafter, the traveling wind primarily passes through the filter membranes 88 of the filter bodies 80 that are fitted into the lower mounting holes 78d, and enters into the interior of the stack case 20 through the rearward opening 40. In the case that the traveling wind is accompanied by fine foreign matter such as sand grains and dust or the like, the foreign matter is captured by the filter membranes 88. Accordingly, it is difficult for such foreign matter to enter into the stack case 20.

The temperature of the fuel cell stack 18 inside the stack case 20 rises accompanying the generation of electrical power by the unit cells 34. Therefore, heat is applied from the fuel cell stack 18 to the traveling wind that has entered into the interior of the stack case 20. Consequently, the traveling wind causes a rise in temperature, and the traveling wind rises inside the stack case 20. On the other hand, the fuel cell stack 18 is cooled by the traveling wind.

When a small amount of the fuel gas inevitably leaks out from the fuel cell stack 18 into the stack case 20, since the specific gravity of the hydrogen within the fuel gas is smaller than that of air, the hydrogen also rises inside the stack case 20. The hydrogen that has risen joins in flowing with the traveling wind. The traveling wind and the hydrogen are discharged from the upper part of the rearward opening 40 to the exterior of the stack case 20 primarily through the filter membranes 88 of the filter bodies 80 that are fitted into the upper mounting holes 78u. The traveling wind and the hydrogen further reach the front room 16 through the ventilation holes formed in the VCU case 102, and are dissipated into the atmosphere from the front room 16.

In the case that it becomes necessary to perform maintenance with respect to the fuel cell stack 18 (in particular, the cell V terminals 60d and 60u and the like), the operator loosens the mounting bolts 130 shown in FIG. 2 and removes the VCU case 102 from the stack case 20. Next, the operator then loosens the fixing bolts 74 and separates the closing member 70 from the stack case 20. Accompanying the separation thereof, the rearward opening 40 is made visible. Accordingly, maintenance can be easily performed on the cell V terminals 60d and 60u and the like which are exposed in the rearward opening 40.

The present invention is not limited to the embodiments described above, and it goes without saying that various modified or additional configurations could be adopted therein without departing from the essence and gist of the present invention.

For example, in the present embodiments, although a case in which the fuel cell system 10 is mounted in the fuel cell vehicle 12 has been illustrated, the fuel cell system 10 may be used as a so-called stationary type of fuel cell system.

In a configuration in which the filter bodies 80 are arranged at positions that avoid the cell V terminals 60d and 60u, it is not essential that the heads of the fixing bolts 74 be arranged at positions that avoid the first lattice-shaped ribs 120 and the second lattice-shaped ribs 122 of the VCU case 102. Similarly, in a configuration in which the heads of the fixing bolts 74 are arranged at positions that avoid the first lattice-shaped ribs 120 and the second lattice-shaped ribs 122 of the VCU case 102, it is not essential that the filter bodies 80 be arranged at positions that avoid the cell V terminals 60d and 60u.

What is claimed is:

1. A fuel cell system comprising a fuel cell stack in which a plurality of individual unit cells are stacked, and a stack case configured to accommodate the fuel cell stack in an interior thereof, wherein:
an opening is formed in an end part of the stack case, and at the plurality of individual unit cells, a plurality of individual cell voltage detection terminals electrically connected to electrodes of the plurality of individual unit cells are provided at portions facing toward the opening;
the stack case comprises a plate-shaped closing member configured to close the opening;
the plate-shaped closing member includes a plurality of individual mounting holes, and a plurality of individual filter bodies individually retained in the plurality of individual mounting holes;
the plurality of individual filter bodies include housings configured to be fitted in the plurality of individual mounting holes, and filter membranes retained in the housing, and when the opening is viewed from the front, the plurality of individual filter bodies are disposed at positions that do not overlap with the plurality of individual cell voltage detection terminals;
the plurality of cell voltage detection terminals include lower side terminals, and upper side terminals disposed upwardly of the lower side terminals;
the plurality of individual mounting holes include: an upper mounting hole formed in the plate-shaped closing member at a more upward position than the upper side terminals; a lower mounting hole formed in the plate-shaped closing member at a more downward position than the lower side terminals; and intermediate mounting holes formed in the plate-shaped closing member at a position between the upper mounting hole and the lower mounting hole in a vertical direction;
the plurality of individual filter bodies include: an upper side filter retained in the upper mounting hole; a lower side filter retained in the lower mounting hole; and intermediate filters retained in the intermediate mounting holes;
the intermediate filters include: an upper-side intermediate filter and a lower-side intermediate filter disposed downwardly of the upper-side intermediate filter;
an electrical equipment storage case in which electrical equipment is accommodated is provided at an end part of the stack case in which the opening is formed;
the electrical equipment storage case is fixed to the stack case in a manner that the plate-shaped closing member is interposed between the stack case and the electrical equipment storage case;
at the electrical equipment storage case, a plurality of ribs projecting out toward the plate-shaped closing member are formed on an end surface facing toward the plate-shaped closing member;
pin-shaped connecting members connect the plate-shaped closing member to the stack case; and
ends of the pin-shaped connecting members projecting out from the plate-shaped closing member toward the electrical equipment storage case are inserted into internal spaces surrounded by the plurality of ribs.

2. The fuel cell system according to claim 1, wherein the plurality of cell voltage detection terminals are arranged in parallel alongside one another in a stacking direction of the plurality of unit cells, and among the plurality of cell voltage detection terminals, mutually adjacent ones of the cell voltage detection terminals are staggered in a vertical direction of the plurality of unit cells.

3. A fuel cell system comprising a fuel cell stack in which a plurality of individual unit cells are stacked, and a stack case configured to accommodate the fuel cell stack in an interior thereof, wherein:
an opening is formed in an end part of the stack case, and at the plurality of individual unit cells, a plurality of individual cell voltage detection terminals electrically connected to electrodes of the plurality of individual unit cells are provided at portions facing toward the opening;
the stack case comprises a plate-shaped closing member configured to close the opening;
the plate-shaped closing member includes a plurality of individual mounting holes, and a plurality of individual filter bodies individually retained in the plurality of individual mounting holes;
the plurality of individual filter bodies include housings configured to be fitted in the plurality of individual mounting holes, and filter membranes retained in the housing, and when the opening is viewed from the front, the plurality of individual filter bodies are disposed at positions that do not overlap with the plurality of individual cell voltage detection terminals, wherein:
an electrical equipment storage case in which electrical equipment is accommodated is provided at an end part of the stack case in which the opening is formed;
the electrical equipment storage case is fixed to the stack case in a manner that the plate-shaped closing member is interposed between the stack case and the electrical equipment storage case;
at the electrical equipment storage case, a plurality of ribs projecting out toward the plate-shaped closing member are formed on an end surface facing toward the plate-shaped closing member;
pin-shaped connecting members connect the plate-shaped closing member to the stack case; and
ends of the pin-shaped connecting members projecting out from the plate-shaped closing member toward the electrical equipment storage case are inserted into internal spaces surrounded by the plurality of ribs.

4. The fuel cell system according to claim 3, wherein the electrical equipment storage case includes a flow path forming member configured to form a coolant flow path, and the plurality of individual ribs are formed in the flow path forming member.

5. A fuel cell system comprising a fuel cell stack in which a plurality of individual unit cells are stacked, and a stack case configured to accommodate the fuel cell stack in an interior thereof, wherein:
an opening is formed in an end part of the stack case, and the unit cells are provided with, at portions facing toward the opening, a plurality of individual cell voltage detection terminals electrically connected to electrodes of the plurality of individual unit cells;
the stack case comprises a plate-shaped closing member configured to close the opening;
the plate-shaped closing member includes a plurality of individual mounting holes and a plurality of individual filter bodies individually retained in the plurality of individual mounting holes;
an electrical equipment storage case configured to contain an electrical equipment is provided at an end of the stack case in which the opening is formed;

the electrical equipment storage case is fixed to the stack case in a manner that the plate-shaped closing member is interposed between the stack case and the electrical equipment storage case, the electrical equipment storage case is formed with a plurality of individual ribs projecting out toward the plate-shaped closing member on an end surface facing toward the plate-shaped closing member;

pin-shaped connecting members connect the plate-shaped closing member to the stack case; and ends of the pin-shaped connecting members projecting out from the plate-shaped closing member toward the electrical equipment storage case are inserted into internal spaces surrounded by the plurality of individual ribs.

6. The fuel cell system according to claim 5, wherein the electrical equipment storage case includes a flow path forming member configured to form a coolant flow path, and the plurality of individual ribs are formed in the flow path forming member.

* * * * *